(12) United States Patent
Vogel et al.

(10) Patent No.: US 10,788,322 B2
(45) Date of Patent: Sep. 29, 2020

(54) METHOD AND APPARATUS FOR ASSIGNING MEASURING POINTS TO A SET OF FIXED POINTS

(71) Applicant: TRIMBLE Jena GmbH, Jena (DE)

(72) Inventors: Michael Vogel, Schleifreisen (DE); Thomas Korn, Jena (DE)

(73) Assignee: TRIMBLE Jena GmbH, Jena (DE)

( * ) Notice: Subject to any disclaimer, the term of this patent is extended or adjusted under 35 U.S.C. 154(b) by 1205 days.

(21) Appl. No.: 13/945,796

(22) Filed: Jul. 18, 2013

(65) Prior Publication Data

US 2014/0088915 A1 Mar. 27, 2014

(30) Foreign Application Priority Data

Sep. 25, 2012 (DE) .................. 10 2012 217 282

(51) Int. Cl.
*G01C 15/00* (2006.01)
*G01C 15/04* (2006.01)
(Continued)

(52) U.S. Cl.
CPC ............ *G01C 15/00* (2013.01); *G01C 15/04* (2013.01); *G01C 15/06* (2013.01); *G01B 5/008* (2013.01); *G01B 21/04* (2013.01)

(58) Field of Classification Search
CPC ........ G01C 15/00; G01C 15/04; G01C 15/06; G06F 3/011; G01B 5/008; G01B 21/04;
(Continued)

(56) References Cited

U.S. PATENT DOCUMENTS 4,681,433 A * 7/1987 Aeschlimann .......... G01S 17/88
356/141.1
4,988,192 A * 1/1991 Knittel ..................... G01C 1/02
33/281
(Continued)

FOREIGN PATENT DOCUMENTS

CN 1147083 A * 4/1997
CN 101105524 A * 1/2008
(Continued)

OTHER PUBLICATIONS

*Electric Power Group v. Alstom Case* (Attached).*
(Continued)

*Primary Examiner* — Alexander Satanovsky
*Assistant Examiner* — Leonard S Liang
(74) *Attorney, Agent, or Firm* — Kilpatrick Townsend & Stockton LLP

(57) ABSTRACT

Assigning measuring points to fixed points includes calculating fixed point distances between fixed points in a fixed point coordinate system; determining coordinates of measuring points in a measuring point coordinate system; calculating measuring point distances between the measuring points; comparing at least two measuring point distances with the fixed point distances and identifying at least two pairs each consisting of a measuring point distance and a fixed point distance; determining a reference point in the measuring point coordinate system or in the fixed point coordinate system; determining first and second reference point parameters of the measuring points or fixed points corresponding to the pairs; determining second reference point parameters of the fixed points corresponding to the pairs in the fixed point coordinate system; identifying correspondences between the first reference point parameters and the second reference point parameters and assigning the
(Continued)

corresponding measuring points to the corresponding fixed points.

15 Claims, 8 Drawing Sheets

(51) Int. Cl.
*G01C 15/06* (2006.01)
*G01B 21/04* (2006.01)
*G01B 5/008* (2006.01)

(58) Field of Classification Search
CPC ...... G01B 21/042; G01B 21/045; G01V 1/28; G01V 1/30; G01D 5/2448; G06T 7/0018
USPC ................................ 702/150, 152, 14, 94–95
See application file for complete search history.

(56) References Cited

U.S. PATENT DOCUMENTS

| | | | | |
|---|---|---|---|---|
| 5,477,459 A | * | 12/1995 | Clegg | G01S 5/16 356/152.1 |
| 5,831,573 A | * | 11/1998 | Muir | G01S 19/42 342/357.31 |
| 5,841,441 A | * | 11/1998 | Smith | G06T 15/04 345/587 |
| 6,370,476 B1 | * | 4/2002 | McBride | G01S 5/02 33/320 |
| 6,473,166 B1 | * | 10/2002 | Ohishi | G01C 15/002 356/141.1 |
| 6,473,716 B1 | * | 10/2002 | Ohishi | G01B 11/002 356/3 |
| 7,180,072 B2 | | 2/2007 | Persi et al. | |
| 7,319,511 B2 | * | 1/2008 | Murai | G01C 15/002 356/4.01 |
| 9,791,569 B2 | * | 10/2017 | Hughes | G01S 7/497 |
| 9,829,308 B2 | * | 11/2017 | Stewart | B02C 4/32 |
| 10,378,891 B2 | * | 8/2019 | Franke | G01B 11/0616 |
| 2003/0160757 A1 | * | 8/2003 | Shirai | G01C 1/04 345/156 |
| 2005/0057745 A1 | * | 3/2005 | Bontje | G01O 15/002 356/139.03 |
| 2006/0017938 A1 | * | 1/2006 | Ohtomo | G01C 1/04 356/611 |
| 2006/0192946 A1 | * | 8/2006 | Walser | G01C 1/04 356/144 |
| 2007/0052951 A1 | * | 3/2007 | Van Cranenbroeck | G01C 15/002 356/139.03 |
| 2007/0133012 A1 | * | 6/2007 | Euler | G01C 11/02 356/614 |
| 2008/0116354 A1 | * | 5/2008 | Kirschner | G01C 1/04 250/208.1 |
| 2008/0204698 A1 | * | 8/2008 | Rohner | G01B 9/02004 356/4.01 |
| 2008/0204699 A1 | * | 8/2008 | Benz | G01C 15/002 356/4.01 |
| 2008/0205707 A1 | * | 8/2008 | Braunecker | G01C 1/04 382/106 |
| 2009/0082992 A1 | * | 3/2009 | Green | G01C 15/002 702/152 |
| 2010/0102980 A1 | * | 4/2010 | Troy | G05B 19/042 340/686.6 |
| 2010/0119161 A1 | * | 5/2010 | Moeller | G01C 15/002 382/216 |
| 2010/0158361 A1 | * | 6/2010 | Grafinger | C21O 5/441 382/165 |
| 2010/0232714 A2 | | 9/2010 | Moeller | |
| 2011/0109915 A1 | * | 5/2011 | Buehlmann | G01C 15/002 356/614 |
| 2012/0008136 A1 | * | 1/2012 | Jaeger | G01C 1/02 356/138 |
| 2012/0038932 A1 | * | 2/2012 | Lenz | G01C 15/004 356/601 |
| 2013/0113897 A1 | * | 5/2013 | Kurtovic | G01C 15/00 348/50 |
| 2013/0278759 A1 | * | 10/2013 | Zimmermann | G01C 15/06 348/140 |
| 2014/0210663 A1 | * | 7/2014 | Metzler | G01C 15/00 342/357.34 |
| 2015/0042977 A1 | * | 2/2015 | Siercks | G01C 15/002 356/4.01 |
| 2015/0056369 A1 | * | 2/2015 | Kohn | G01C 15/06 427/137 |

FOREIGN PATENT DOCUMENTS

| | | | | |
|---|---|---|---|---|
| CN | 102589533 A | * | 7/2012 | |
| CN | 102980556 A | * | 3/2013 | |
| CN | 104266638 A | * | 1/2015 | |
| CN | 105444701 A | * | 3/2016 | |
| JP | 02028510 A | * | 1/1990 | |
| JP | 2003156332 A | * | 5/2003 | |
| JP | 2004085553 A | * | 3/2004 | |
| JP | 2006234776 A | * | 9/2006 | |
| WO | 2009/055955 A1 | | 5/2009 | |
| WO | 2010/094751 A2 | | 8/2010 | |
| WO | 2010/108644 A1 | | 9/2010 | |
| WO | WO 2011156941 A1 | * | 12/2011 | ............ G01C 15/00 |
| WO | WO-2011156941 A1 | * | 12/2011 | ............ G01C 15/00 |
| WO | 2 142 884 B1 | | 7/2012 | |

OTHER PUBLICATIONS

Interview Agenda for 13945796.*
Machine Translation for CN1147083A (Year: 1997).*
Machine Translation for CN101105524A (Year: 2008).*
Machine Translation for CN102589533 (Year: 2012).*
Machine Translation for CN102980556 (Year: 2013).*
Machine Translation for CN104266638 (Year: 2015).*
Machine Translation for CN105444701 (Year: 2016).*
Machine Translation for JP4545093B2 (Year: 2010).*
Machine Translation for JP2003156332A (Year: 2003).*
Machine Translation for JP2004085553A (Year: 2004).*
Machine Translation for JP2006234776A (Year: 2006).*
Machine Translation for WO2009055955A1 (Year: 2009).*
Machine Translation for WO2011156941A1 (Year: 2011).*
Gruber, F. J. et al., "Formelsammlung für das Vermessungswesen," 14th ed.. Auflage, Studium, pp. 98-102.
Translation of the relevant parts from "Formelsammlung für das Vermessungswesen" (Formulary for Surveying), 14th ed., published by Vieweg+Teubner, pp. 98-102.

* cited by examiner

Input data:

Measured stretches and angles (STP1)

| PNR | Stretch(es) | Direction angle (t) |
|---|---|---|
| 202 | 2,915 | 0,000 |
| 201 | 3,808 | 125,838 |
| 206 | 5,731 | 209,787 |
| 207 | 2,907 | 265,601 |

— 505

Calculation of the coordinates in a temporary coordinate system (MP):

$$x = s * \sin t \qquad y = s * \cos t$$

MP

| PNR | X | Y |
|---|---|---|
| 202 | 0,000 | 2,915 |
| 201 | 3,087 | -2,230 |
| 206 | -2,847 | -4,974 |
| 207 | -2,898 | -0,223 |

— 510

Calculation of the stretches in a temporary coordinate system (MP):

$$s = \sqrt{(x_1 - x_2)^2 + (y_1 - y_2)^2}$$

StretchMP

|  | 202 | 201 | 206 | 207 |
|---|---|---|---|---|
| 202 | 0,000 | A 6,000 | B 8,387 | C 4,272 |
| 201 | A 6,000 | 0,000 | D 6,538 | E 6,313 |
| 206 | B 8,387 | D 6,538 | 0,000 | F 4,751 |
| 207 | C 4,272 | E 6,313 | F 4,751 | 0,000 |

— 515

Compare with 525 of Figure 5b

Stretch01_MP

|  | 0 | A | 8 | B | 2 | C | 2 |
|---|---|---|---|---|---|---|---|
| A | 8 |  | 0 | D | 2 | E | 4 |
| B | 2 | D | 2 |  | 0 | F | 2 |
| C | 2 | E | 4 | F | 2 |  | 0 |

— 530

Assign a point number to a critical point

OK for this case

Fig. 5a

Figure 5B:
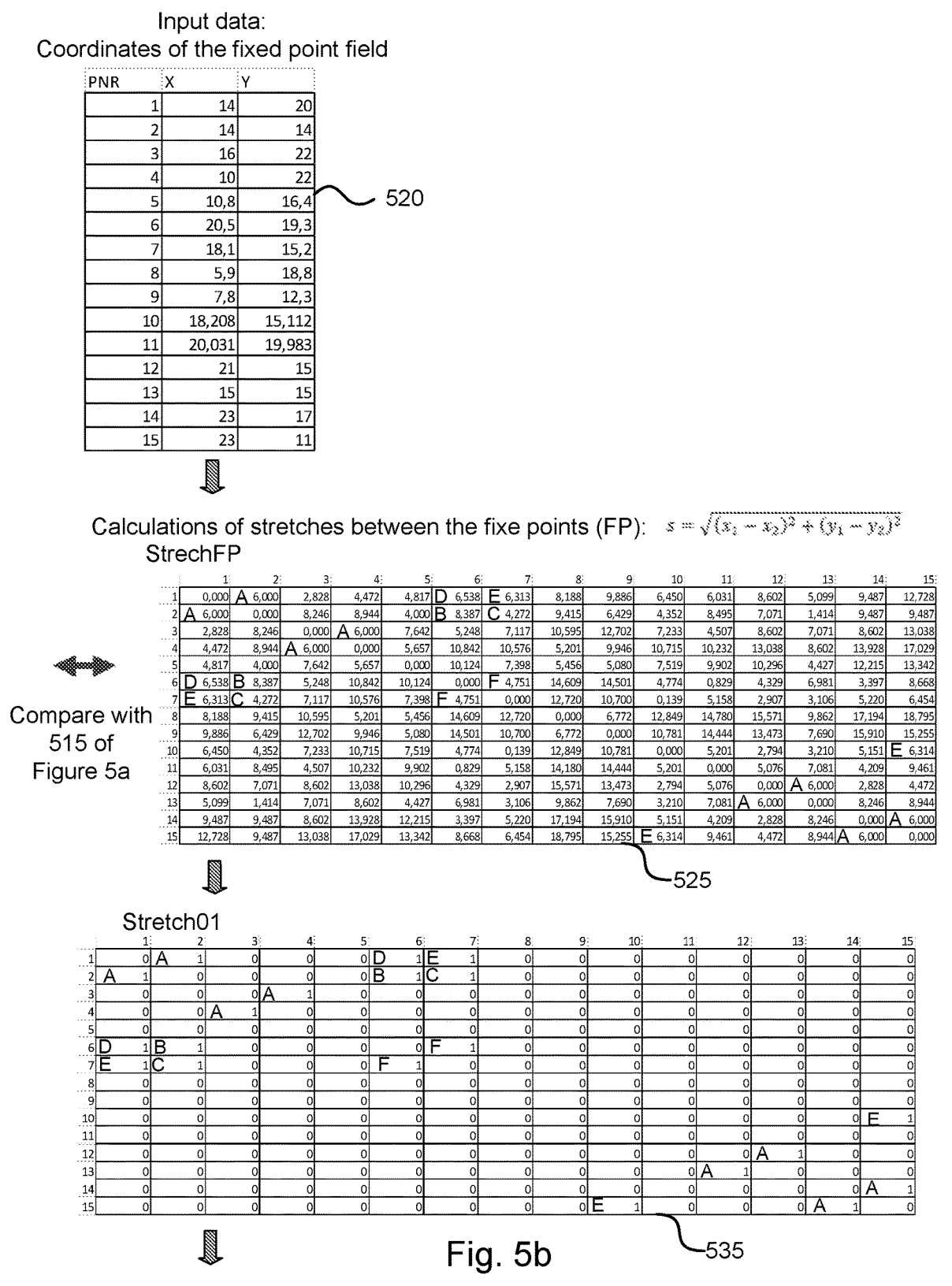

Input data:
Coordinates of the fixed point field

| PNR | X | Y |
|---|---|---|
| 1 | 14 | 20 |
| 2 | 14 | 14 |
| 3 | 16 | 22 |
| 4 | 10 | 22 |
| 5 | 10,8 | 16,4 |
| 6 | 20,5 | 19,3 |
| 7 | 18,1 | 15,2 |
| 8 | 5,9 | 18,8 |
| 9 | 7,8 | 12,3 |
| 10 | 18,208 | 15,112 |
| 11 | 20,031 | 19,983 |
| 12 | 21 | 15 |
| 13 | 15 | 15 |
| 14 | 23 | 17 |
| 15 | 23 | 11 |

— 520

Calculations of stretches between the fixe points (FP): $s = \sqrt{(x_1 - x_2)^2 + (y_1 - y_2)^2}$
StrechFP Compare with 515 of Figure 5a Stretch01

Fig. 5b identstretch2

To Fig. 5a

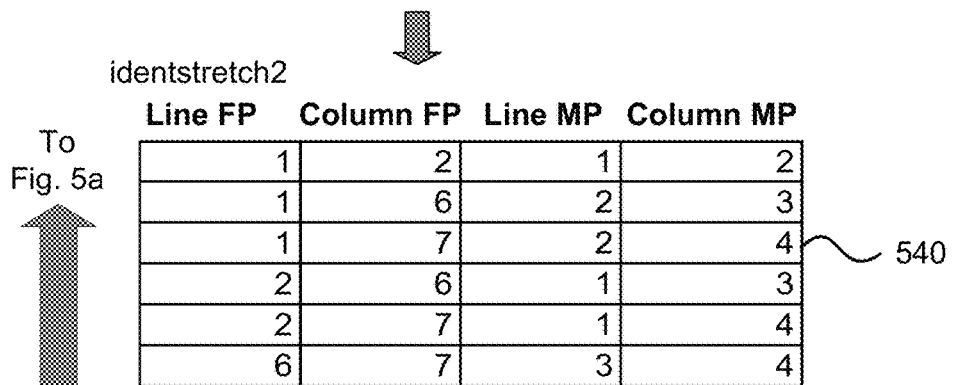

540

Check whether the dimension of the measuring points (identStSingleMP) corresponds with the dimension of the used fixed points (identStsingleFP)

| identStsingleMP |
|---|
| 1 |
| 2 |
| 3 |
| 4 |

542

| identStsingleFP |
|---|
| 1 |
| 2 |
| 6 |
| 7 |

544

If NO, check which points are critical

YES

Calculate the focal point of the measuring points (identStsingleMP) and the used fixed points (identStsingleFP)

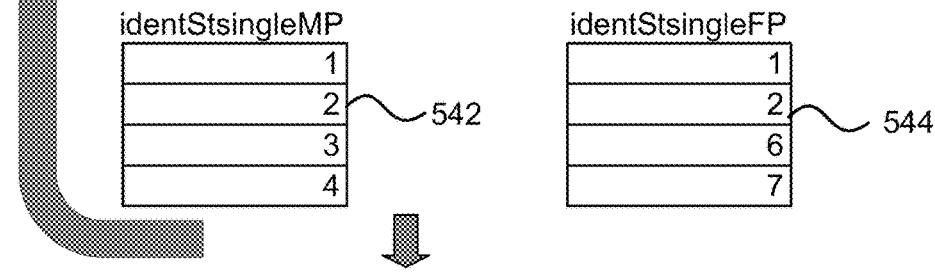

Identify by means of the stretches from the focal point the identical points

| PNR FP | PNR MP |
|---|---|
| 1 | 201 |
| 2 | 202 |
| 6 | 206 |
| 7 | 207 |

Measuring points are identified in the fixed point field

METHOD AND APPARATUS FOR ASSIGNING MEASURING POINTS TO A SET OF FIXED POINTS

CROSS-REFERENCE TO RELATED APPLICATIONS

This application claims priority to German Patent Application No. 10 2012 217 282.3, filed Sep. 25, 2012, the entire contents of which are hereby incorporated by reference in their entirety for all purposes.

FIELD OF THE INVENTION

The present invention relates to a method and an apparatus for assigning measuring points to a set of fixed points, and in particular to a method and an apparatus which can calculate distances between fixed points and measuring points for the positioning of a measuring instrument.

BACKGROUND

Measuring instruments, such as for example surveying instruments and in particular tacheometers, theodolites, or total stations, are used to measure distances and/or directions to/from objects. Here, in order to determine a position, the distances and/or directions are obtained in relation to the measuring instrument. However, with knowledge of a reference point of a different coordinate system, the coordinates of the position can be transformed into coordinates of the other coordinate system.

The surveying instruments described above are not only used on building sites for the planning of buildings or within shells of buildings, but can also be used for the mapping of different areas. For example, by means of these measuring instruments maps can be produced which include precise positions of objects located in the area. In addition, it is also possible to record in addition to precise positional data the corresponding images of the area being surveyed. Accurate maps or plans can thus be obtained by means of surveying instruments.

When using surveying instruments, such as e.g. geodetic measuring instruments, on building sites it is necessary to determine the position of the surveying instrument accurately in relation to the building to be constructed so that by means of construction plans and by using the surveying instrument a position of a wall, door, window, roof etc. to be constructed can be determined accurately. If the relationship between the coordinate system of the instrument and the coordinate system of the building is known, one can easily carry out a transformation from one to the other and vice versa.

Generally a number of surveying points are set at the start of a building project. The exact positions of these surveying points are recorded in comparison to already existing surveying points, buildings, roads or other cadastral or land register data. In particular, in a number of countries, such as e.g. Germany, there is a surveying network covering the whole country with known, already existing surveying points which generally correspond to a point marked permanently on the ground or on a building and which geodesists use as a starting or target point for measurements.

In the following, a surveying point of a specific fixed point field, that can be limited, for example, to a building site, is called a fixed point. This type of fixed point can correspond to an already existing surveying point or can be set before or during a building project. By focusing on these points (surveying points) the position of the surveying instrument itself can be determined by the direction and distance from the surveying instrument.

For many applications knowledge of these fixed points is absolutely necessary however, in particular for the positioning of the surveying instrument in order to be able to assign the corresponding point identification, e.g. the point number, of the corresponding fixed points to the measured points manually, and so to create the basis for the positioning of the surveying instrument. Since however by measuring a point the corresponding point number is not automatically communicated to the surveying instrument, the manual assignment described above is necessary for this, and this is on the one hand time-consuming and can lead to simple assignment errors. Instead of manually assigning a point number to all of the points measured and focused upon, it may also be sufficient as a starting point, for example, to assign a point number to just one point or to identify just one point in the fixed point field, the other points measured, i.e. measuring points, being able to be obtained afterwards by means of a graphical pattern comparison of the point cloud (point arrangement) of the measuring points with the point cloud of the fixed points.

Consequently, it is desirable to provide a simple method and an easy-to-use apparatus wherein in particular knowledge of a point number and/or manual assignment by a user is not required. In particular, it is desirable to identify a measured point in order to determine a position in a field of fixed points.

SUMMARY OF THE INVENTION

A method and an apparatus that resolve at least one or more of the aforementioned problems are defined in the independent claims. Advantageous embodiments are described in the dependent claims.

According to one embodiment a method for assigning measuring points to a set of fixed points includes calculating fixed point distances between a plurality of fixed points of the set of fixed points using the coordinates of the fixed points in a fixed point coordinate system; determining coordinates of a plurality of measuring points in a measuring point coordinate system; calculating measuring point distances between the plurality of measuring points; and comparing at least two measuring point distances with the fixed point distances and identifying at least two pairs each consisting of a measuring point distance and a fixed point distance. The method further comprises determining a reference point in the measuring point coordinate system by means of a reference point determining method using the coordinates of the measuring points corresponding to the pairs; determining a reference point in the fixed point coordinate system by means of the reference point determining method using the coordinates of the fixed points corresponding to the pairs; determining first reference point parameters of the measuring points corresponding to the pairs in the measuring point coordinate system; determining second reference point parameters of the fixed points corresponding to the pairs in the fixed point coordinate system; and identifying correspondences between the first reference point parameters in the measuring point coordinate system and the second reference point parameters in the fixed point coordinate system and assigning the corresponding measuring points to the corresponding fixed points. A simple method is thus provided which also enables untrained surveyors to position a measuring instrument by assigning measuring points to fixed points due to the ease of use.

In another embodiment the parameters, i.e. reference point parameters, include reference point-dependent distances and/or angles in the measuring point coordinate system and fixed point coordinate system. Since the coordinate systems are normally three-dimensional coordinate systems, the angles can be horizontal angles and/or vertical angles, and the distances can be distances within the three-dimensional space. If a reference to the horizontal is produced, one talks in geodesy of directional angles, i.e. an angle between a measured direction and a reference direction, such as for example the X axis of a coordinate system. The parameters can therefore be obtained in a polar coordinate system that constitutes, for example, a reference system of a measuring instrument.

In another embodiment the first reference point parameters include distances between the measuring points corresponding to the pairs and the reference point in the measuring point coordinate system and/or angles in the measuring point coordinate system that are associated with the measuring points corresponding to the pairs. Similarly, in another embodiment the second reference point parameters include distances between the fixed points corresponding to the pairs and the reference point in the fixed point coordinate system and/or angles in the fixed point coordinate system which are associated with the fixed points corresponding to the pairs. Therefore, the parameters can be obtained in a polar coordinate system with an origin dependent upon the chosen reference point.

According to one embodiment the reference point is a focal point of the measuring points and fixed points corresponding to the pairs. Since the calculation of a focal point is clear, the same focal point as in the corresponding fixed points in the fixed point coordinate system is therefore produced as the focal point of the measuring points in the measuring point coordinate system. Thus, distances and/or angles of different coordinate systems can easily be compared with one another.

In another embodiment the assignment is carried out by using the distances from the reference point, and if no clear assignment is achieved here, the assignment is carried out by using the angles. Thus, even if a number of points have identical or similar distances between one another, a clear assignment can be carried out by using the angles.

In another embodiment the method further includes identifying measuring points that do not correspond to fixed points and removing these measuring points from the plurality of measuring points using the calculated measuring point distances and fixed point distances. Thus, possible errors due to random reflections on, for example, window panes or other reflective objects, can be reduced and incorrect automatic measuring point assignments to a fixed point can be prevented.

In another embodiment the identification includes comparing the fixed point distances with the measuring point distances, and if there is no fixed point distance corresponding to a measuring point distance, rejecting at least one measuring point corresponding to the measuring point distance. Thus, discrepancies between the measuring points and fixed points can automatically be recorded relatively easily and reliably, and possible assignment errors are precluded.

In another embodiment the method includes identifying a number of corresponding fixed point distances of fixed points in the fixed point field and rejecting the fixed points corresponding to the fixed point distances for which there are no corresponding measuring points. Thus, similar or identical fixed point distances can be detected in order to prevent incorrect measuring point assignment to a fixed point.

In another embodiment the identification includes comparing the fixed point distances and adding up the number of corresponding fixed point distances. It can thus be guaranteed that the number of measuring points corresponds to the number of fixed points so that clear point assignments can be carried out.

In another embodiment the method further includes determining the measuring points with the measuring point distance and the directional angle by means of a measuring instrument and calculating the coordinates in the measuring point coordinate system in relation to the position of the measuring instrument. The measuring points can thus be shown in a polar coordinate system of the measuring instrument, such as e.g. a surveying instrument.

In another embodiment the fixed point field itself is defined by a measuring instrument executing the method. For example, in a first step the fixed point field is recorded, i.e. coordinates of the fixed points in the fixed point field, so that at a later time and optionally in a different position of the measuring instrument, this position can be determined once again and the new position can be obtained dependently upon the earlier fixed points.

According to another embodiment of the invention an apparatus for assigning measuring points to a set of measuring points, including at least one processor and at least one computer-readable storage medium with instructions stored in the latter, is provided. Here, when the instructions are executed by the at least one processor, the at least one processor is designed to carry out procedural steps of the method described above. Thus, the advantages described in relation to the method can be achieved.

According to another embodiment of the invention an apparatus for assigning measuring points to a set of measuring points is provided which comprises: means for calculating fixed point distances between a plurality of fixed points of the set of fixed points using the coordinates of the fixed points in a fixed point coordinate system; means for determining coordinates of a plurality of measuring points in a measuring point coordinate system; means for calculating measuring point distances between the plurality of measuring points; means for comparing at least two measuring point distances with the fixed point distances and identifying at least two pairs each consisting of a measuring point distance and a fixed point distance; means for determining a reference point in the measuring point coordinate system by means of a reference point determining method using the coordinates of the measuring points corresponding to the pairs; means for determining a reference point in the fixed point coordinate system by means of the reference point determining method using the coordinates of the fixed points corresponding to the pairs; means for determining first reference point parameters of the measuring points corresponding to the pairs in the measuring point coordinate system; means for determining second reference point parameters of the fixed points corresponding to the pairs in the fixed point coordinate system; means for identifying correspondences between the first reference point parameters in the measuring point coordinate system and the second reference point parameters in the fixed point coordinate system and assigning the corresponding measuring points to the corresponding fixed points.

In another embodiment the apparatus comprises a surveying instrument that determines the distances by electromagnetic distance measurement.

In a further embodiment of the invention a program for a data processing device for executing the methods described above is provided, as is a computer program product that contains the program.

Advantageous features of the invention are disclosed in the claims.

BRIEF DESCRIPTION OF THE DRAWINGS

FIG. 5a shows a sequence of partial steps of an example explaining the method of FIG. 1.

FIG. 5b shows a sequence of partial steps of an example explaining the method of FIG. 1.

FIG. 5c shows a sequence of partial steps of an example explaining the method of FIG. 1.

DETAILED DESCRIPTION OF PREFERRED EMBODIMENTS

Preferred embodiments are described with reference to the figures. It is noted that the following description only includes examples and should not be interpreted as restricting the invention.

Embodiments relate generally to a method and an apparatus for assigning measuring points to a set of fixed points. In particular, distances between different fixed points, in the following called fixed point distances, can be calculated, as can be distances between different measuring points, referred to in the following as measuring point distances. By simply comparing the measuring point distances with the fixed point distances, identical or at least similar distances can be found so that a fixed point distance can be assigned to a measuring point distance. With the aid of the distance assignment it is also possible to assign starting and end points of these distances to one another. This stems from the fact that a distance between two points in every coordinate system, for example the fixed point coordinate system or measuring point coordinate system is equal, by means of which the relative assignment of points to one another in different coordinate systems is the same and so recurring patterns and distances of different coordinate systems can be associated with one another.

Furthermore, as described below in detail, a reference point to the points of the patterns/distances for the measuring points and for the fixed points can respectively be obtained by means of a reference point determining method, by using the same determining method the reference point in the measuring point coordinate system being arranged in relation to the measuring points in exactly the same way as the reference point in the fixed point coordinate system in relation to the fixed points. As shown in the following, by taking precautions so that in particular ambiguities are avoided, clear assignments of individual points can be carried out. After a transformation instruction has been found, such as a fixed point is to be assigned to a measuring point, even without knowledge of a specific point number of a fixed point, a position of a measuring instrument in a fixed point field can then also be obtained in fixed point coordinates.

Figure 1:
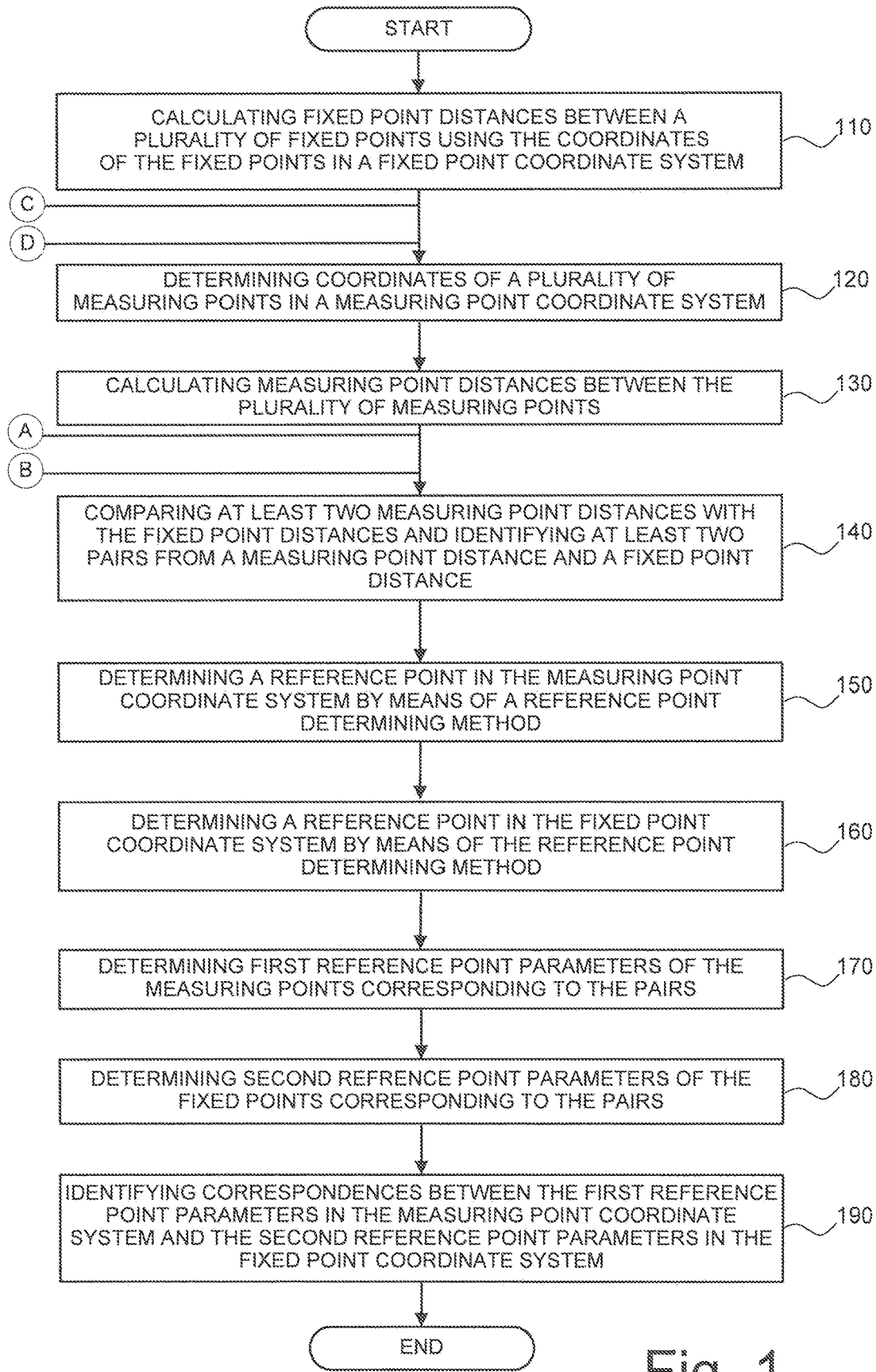
FIG. 1 shows steps of a method for assigning measuring points to a set of fixed points of an embodiment of the invention.

FIG. 1 shows steps of a method for carrying out an assignment of measuring points to fixed points. As already noted, fixed points may constitute existing surveying points of a specific area and/or may be set at the start of a building project.

Figure 2A:
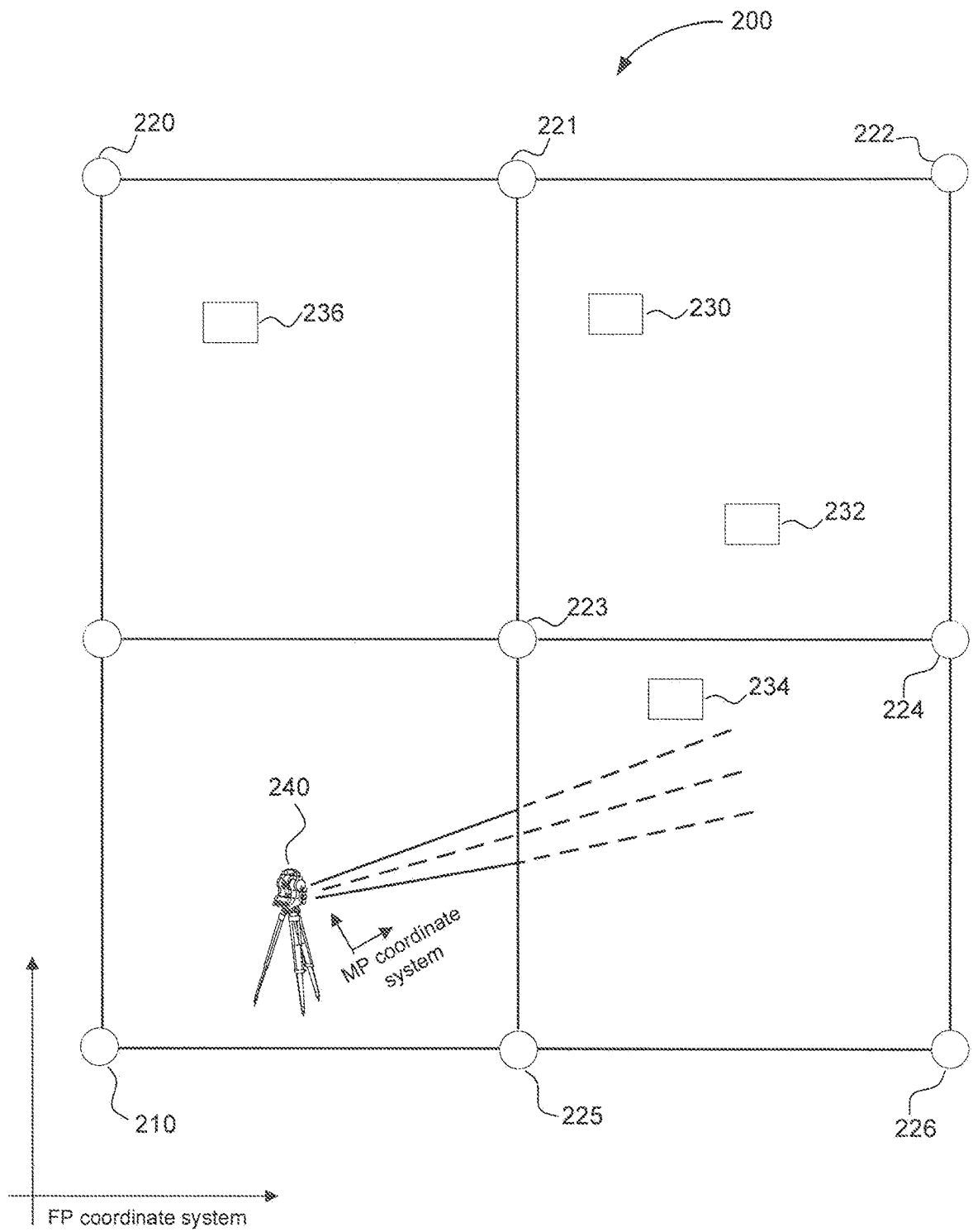
FIG. 2a shows an exemplary illustration of a surveying scenario in which the method shown in FIG. 1 can be used.

FIG. 2a shows an example of fixed points in a fixed point field 200 in an area of a building site. The fixed points 220-226 here are existing surveying points the position of which is known, and the fixed points 230, 232, 234 and 236 are surveying points which were set during the building project. For example, the fixed points 230, 232, 234 and 236 can correspond to positions at which steel joists or concrete blocks are being hoisted or have already been positioned. In this example the point 210 is defined as the origin of the fixed point coordinate system. The fixed points can be provided, for example, with cats' eyes, prisms, plastic reflectors, films or mirrors so that they can easily be detected and surveyed by a surveying instrument.

Since the coordinates of the fixed points in the fixed point coordinate system are normally known, the distances between the fixed points can also be calculated.

Figure 2B:
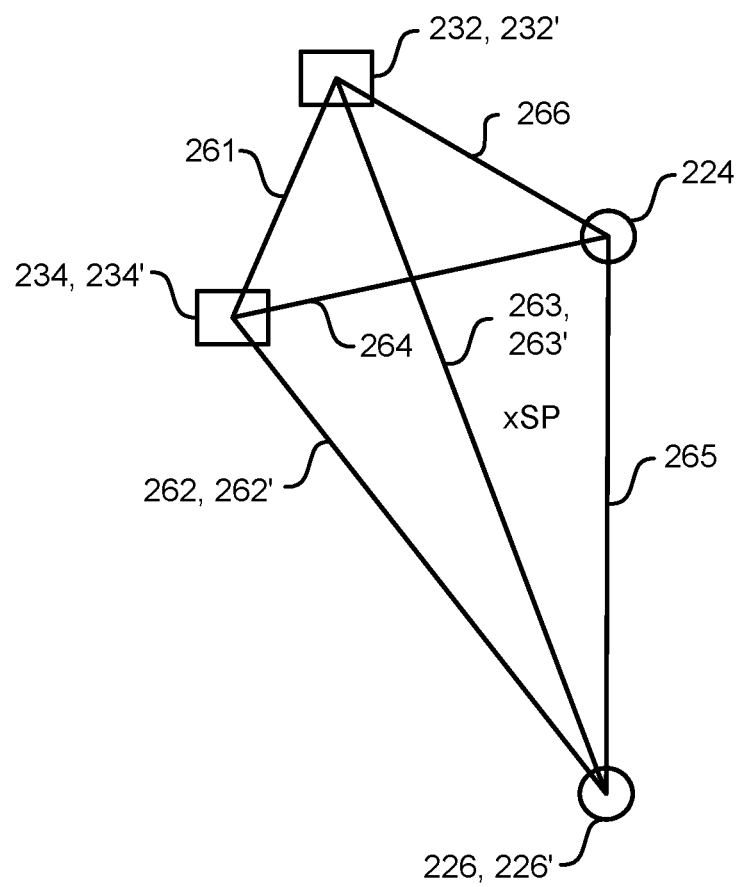
FIG. 2b shows a section of the surveying scenario of FIG. 2a in which point distances are highlighted as stretches between points.

As described in step 110 of the method of FIG. 1, fixed point distances between a plurality of fixed points of the set of fixed points are calculated using the coordinates of the fixed points in the fixed point coordinate system, as shown for example in FIG. 2a. FIG. 2b shows, for example, the distances for the four fixed points 224, 226, 232 and 234 as six stretches 261-266. Accordingly, six fixed point distances can be calculated for four fixed points. FIG. 2b further shows measuring points 226', 232', 234' and measuring point distances 262' and 263'.

If at a later time a measuring instrument, such as for example a surveying instrument 240 of FIG. 2a, is placed in a fixed point field, at the start the position of this measuring instrument in the fixed point field is still unknown. According to conventional methods described above different fixed points would be measured, and it would be communicated to the measuring instrument which measuring point (point number) is measured with which coordinates. This information is not absolutely necessary according to the method of the invention.

According to FIG. 1, in step 120 coordinates of a plurality of measuring points in the measuring point coordinate system, for example the coordinate system spanning through the measuring instrument 240, are determined, and then the measuring point distances between the plurality of measuring points are calculated, as shown in step 130. In the example in FIG. 2a some fixed points of the field, which can be shown by reflectors such as cats' eyes, prisms, plastic reflectors, reflective foils, mirrors, etc., correspond to the measuring points which are focused upon and/or surveyed by the measuring instrument 240 for the determination. The measuring instrument 240 which measures the distances and directions to the measuring points, from which measuring point distances (the measuring point distance is the distance between the position of the measuring instrument and the measuring point) and the directional angles are produced can, for example constitute a surveying instrument and can calculate the coordinates in the measuring point coordinate system in relation to the position of the instrument. The fixed point field can be defined at a previous point in time by a different or the same measuring instrument.

According to the example of FIG. 2b four fixed points 232, 234, 224 and 226 are focused on, surveyed and recorded, and these then constitute measuring points in the measuring point coordinate system. The same arrangement of points shown in FIG. 2b is also produced in the measuring point coordinate system, and so in the following reference can also be made to this figure when measuring points and measuring point measuring point distances are being considered. In order to make a distinction when measuring points and measuring point distances are being considered, these points and distances are identified by "'".

Of course the sequence of steps 110 to 130 can also be different, and so for example first of all steps 120 and 130 are carried out before step 110 is carried out.

Next, in step 140 of FIG. 1 distances are compared. In detail, at least two measuring point distances, e.g. 262' and 263', are compared with the previously calculated fixed point distances, e.g. 261-266. In this way, at least two pairs each consisting of a measuring point distance and a fixed point distance can be identified. The two distances of a pair of distances are identical in the optimal case. However, in practice there are mostly measuring accuracies such that identification of a correspondence between the measuring point distance and the fixed point distance should be carried out such that the respective distances should be within a specific tolerance range in order to be interpreted as equal.

In step 150 of FIG. 1 a reference point is determined in the measuring point coordinate system by means of a reference point determining method using the measuring point coordinates of the measuring points corresponding to the pairs. As mentioned above, the coordinates of the measuring points corresponding to the pairs comprising the measuring point distance and the fixed point distance can be obtained by the measuring instrument 240, the coordinates constituting, for example, directions and distances from the measuring instrument to measuring points. A reference point determining method is for example a method for determining a focal point of a number of points, and so the reference point constitutes the focal point.

Similarly, according to step 160 a reference point in the fixed point coordinate system can be determined by means of the reference point determining method using the coordinates of the fixed points corresponding to the pairs.

If the same determining method is used for determining the reference point of the measuring point coordinate system (reference point MP) and the reference point of the fixed point coordinate system (reference point FP), the ratios between the reference point MP to the measuring points are the same as the ratios of the reference point FP to the fixed points. In the case of choosing the geometric focal point as a reference point, one can thus obtain the same focal point in different coordinate systems, namely in the fixed point coordinate system and the measuring point coordinate system, so that the reference point is a focal point of the measuring points and fixed points corresponding to the pairs.

With the aid of this reference point first and second reference point parameters can be determined. In step 170 first reference point parameters of the measuring points corresponding to the pairs in the measuring point coordinate system are determined, and in step 180 second reference point parameters of the fixed points corresponding to the pairs are determined in the fixed point coordinate system. More precisely, since the coordinates of the reference point FP and the fixed points are known, the second reference point parameters, e.g. distances and/or angles between the reference point FP and the fixed points corresponding to the pairs can be calculated. In the same way the distances and/or angles can be calculated as first reference point parameters from the reference point MP to the measuring points corresponding to the pairs.

In other words, the first reference point parameters include distances between the measuring points corresponding to the pairs and the reference point in the measuring point coordinate system and/or angles in the measuring point coordinate system which are associated with measuring points corresponding to the pairs. Similarly, the second measuring point parameters include distances between the fixed points corresponding to the pairs and the reference point in the fixed point coordinate system and/or angles in the fixed point coordinate system which are associated with the fixed points corresponding to the pairs.

After obtaining the first and second reference point parameters, correspondences between the same can be identified in step 190. In particular, correspondences between the first reference point parameters, e.g. distances and/or angles, in the measuring point coordinate system and the second reference point parameters, e.g. distances and/or angles, are identified in the fixed point coordinate system.

Since, as shown in the example of FIG. 2b, the distance from a reference point, here the focal point SP, to the fixed point 232 corresponds to the distance from the focal point SP to the measuring point 232', by comparing the first and second reference point parameters, here the distances, assignment of measuring points to corresponding fixed points can be carried out. Assignment by using the distances from the reference point is generally simpler than assignment by using angles since between the fixed point coordinate system and the measuring point coordinate system different reference directions, such as e.g. the x axis, can be defined so that only the angle differences correspond. If, however, no clear assignment is achieved by using the distances, the assignment can additionally or alternatively be carried out by using the angles, as is described in detail with reference to FIGS. 5a-5c.

As noted above in connection with steps 110-130, the invention is not restricted to the sequence of steps shown in FIG. 1. For example, step 160 can take place before step 150 and step 170 before step 160, to name just one further example of a sequence.

As described above, the relative arrangement of measuring points in relation to one another is substantially the same as the relative arrangement of fixed points in relation to one another since these are basically the same points. However, even if a correspondence between the fixed point distances 262 and 263 with the measuring point distances 262' and 263' is identified, by means of which by the above steps 234' can be assigned to fixed point 234; 226' to fixed point 226; and 232' to fixed point 232, the position of the measuring instrument 240 in the fixed point field is not yet known. This position can however then be obtained with the aid of the fixed point coordinates assigned to the measuring points.

In the following, with reference to FIG. 3 and FIG. 4 measures are described by means of which the discrepancies between measuring points and fixed points can be detected relatively easily and reliably and in this way assignment errors can be minimized or precluded.

Figure 3:
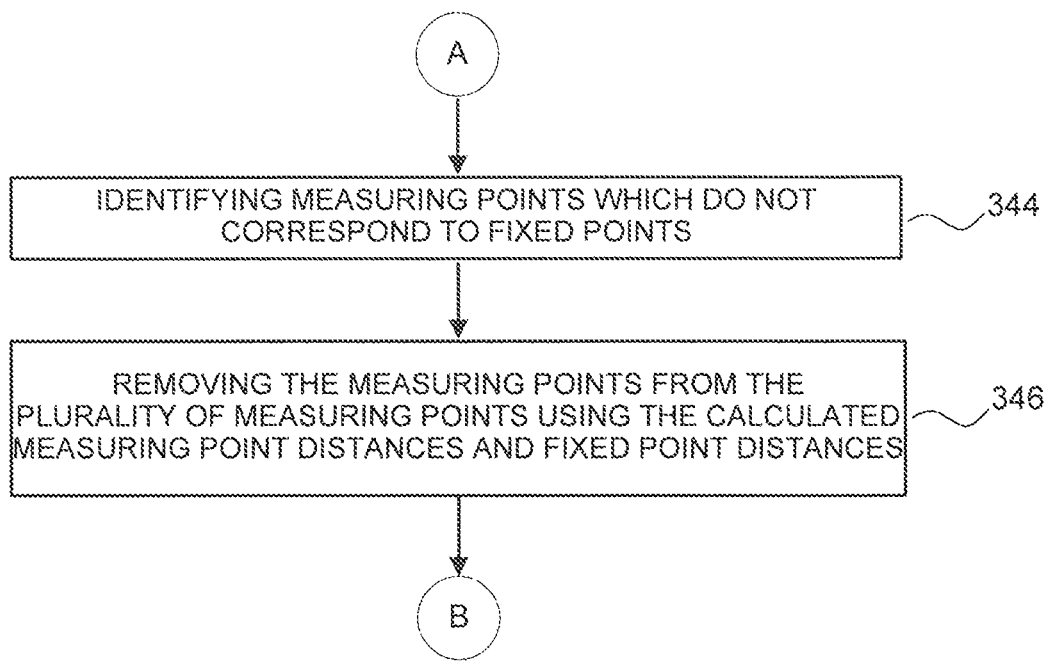
FIG. 3 shows procedural steps which can be executed in connection with the method shown in FIG. 1.

FIG. 3 shows two steps 344 and 346 which can be executed, for example, after step 130 or 140 of FIG. 1. In step 344 measuring points are identified which do not correspond to any fixed points.

These measuring points may arise, for example, if reflections on windows or panes or metallic objects occur which suggest a reflector for surveying, such as e.g. cats' eyes, prisms, mirrors, etc., which is not there however. This type of measuring point could also correspond to a real fixed point which has not, however, previously been recorded in the fixed point field, and so its existence and coordinates are not known for the implementation of the method. Since such measuring points can not be assigned to any known fixed point, these measuring points are removed in advance from the plurality of measuring points using the calculated measuring point distances and fixed point distances—see step 346. The identification in step 344 is carried out, for example, by comparing the fixed point distances with the measuring point distances, and if there is no fixed point distance corresponding to a measuring point distance, it can be concluded that at least one measuring point of this measuring point distance has no correspondence in the fixed point field so that at least one measuring point corresponding to the measuring point distance is rejected.

Figure 4:
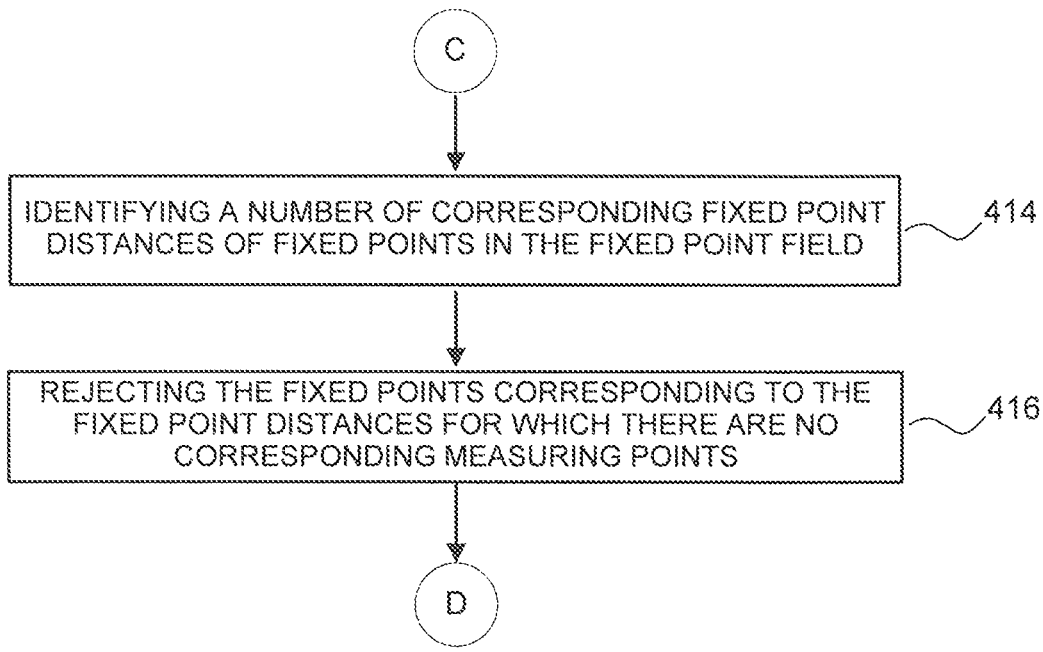
FIG. 4 shows procedural steps which can be executed in connection with the method shown in FIG. 1.

Like steps 344 and 346, steps 414 and 416 of FIG. 4 can also, for example, be executed after step 130 or 140 of the method in FIG. 1, but also after step 110 since after step 110 the fixed point distances are known.

In detail, in step 414 a number of corresponding fixed point distances from fixed points in the fixed point field are identified. This can be carried out, for example, by means of a column analysis of a matrix with different fixed point distances, as will be described in detail below with reference to FIGS. 5a-5c. A number of corresponding fixed point distances can lead to ambiguities since a measuring point distance with the same value can be assigned to a number of fixed point distances.

In order to avoid such ambiguities, according to step 416 fixed points of the fixed point distances for which there are no corresponding measuring points are rejected. The identification according to step 414 can be carried out, for example, by comparing the fixed point distances and adding up the number of corresponding fixed point distances, as described in the following with reference to FIGS. 5a-5c.

In the following FIGS. 5a-5c, which explain the method described in FIG. 1 by means of a detailed example, are discussed. In particular, in FIGS. 5a-5c a routine for identifying points which are measured in two different epochs are described. This routine can be used as preparatory work for free positioning without detailed knowledge of a fixed point field.

Measurements, which are taken for example in the fixed point field by the measuring instrument 240 in FIG. 2a provide in the following distances and directions from the location of the measuring instrument or measuring device to the measuring points. In Table 505 of FIG. 5a PNR in the first column designates any point number, and the second and third columns specify the corresponding stretches (stretches are used here as a synonym for distances) and directional angles from the location of the measuring instrument to the measuring point with the corresponding point number.

As also shown in FIG. 5a, by simple transformations the polar coordinate stretch and directional angles can be converted into x,y coordinates of a temporary measuring point coordinate system in which the measuring instrument has its origin. The result is shown in Table 510.

With the simple mathematical formula $$s=\sqrt{(x_1-x_2)^2+(y_1-y_2)^2}$$

the stretches or distances between the measuring points (MP) can be calculated. The corresponding stretches between the measuring points 202, 201, 206 and 207 are shown in Table 515. If the measuring points measured correspond to known fixed points, the same distances between fixed points must appear in the fixed point field. This is explored in FIG. 5b.

Table 520 in FIG. 5b shows the x,y coordinates of the fixed point field which can be used as input data for the method described in FIG. 1. If a measuring instrument carries out the method described in FIG. 1, the coordinates of the fixed point field can be loaded into the measuring instrument via a corresponding interface. For example, the data can be transmitted to the measuring instrument by a memory card such as a flash memory or by downloading from a server either wirelessly or by means of a cable connection. As already described, the coordinates of the fixed points can therefore also be recorded on the measuring instrument such that the latter has measured and stored the fixed points at a previous point in time, i.e. in a first epoch.

In the first column in Table 520 15 point numbers of 15 fixed points are listed, and in the second and third column the corresponding x and y coordinates of these points are to be found. As already described with regard to Tables 510 and 515, the individual distances and stretches between the fixed points can be obtained by a simple mathematical formula and recorded in a table. Since in this example 15 fixed points are used, Table 525 (stretchFP) containing the distances is considerably larger than the corresponding Table 515 (stretchMP).

In the following step Tables 515 and 525, i.e. stretchMP and stretchFP, can now be compared with one another in order to identify similar or identical distances.

As already mentioned, in practice a specific tolerance is defined, such as e.g. +/−3%, in which the distances are still to be considered as corresponding or identical. In order to make it easier to identify the corresponding distances between Tables 515 and 525, the cells with the same distances have been marked with the same letter. For example, A identifies all cells which contain a distance of 6,000. For the distance 8,387 the letter B has been used, and for the other four distances shown the further letters C, D, E and F have been used.

After the distances of Tables 515 and 525 have been compared and corresponding distances within a specific tolerance have been found, the number of corresponding distances is added up. From the comparison of the distances of the measuring points with the distances of the fixed points a table is produced in matrix form in the dimension of the measuring points, as shown in FIG. 5a by means of Table 530. The figures in the table specify how may corresponding distances have been found for the distances considered in Table 525 (stretchFP).

In a clear assignment there is a "2" in the cell of Table 530. If there are a number of distances corresponding to the considered distance between two measuring points (measuring point distance) in the distances of the fixed points (fixed point distance), the number increases consequently. A clear assignment is then not possible without further investigation. Furthermore, a number equal to "0" outside of the diagonals of the matrix-type Table 530 indicates that no fixed point distance has been found for a measuring point distance.

A simple check to see whether a measuring point that is not included in the fixed point data has been measured consists of calculating the column total of Table 530 (stretch01_MP). The column total must be neither "0" nor "1", otherwise the corresponding values from Tables 505 and 510 are deleted. For example, no uneven numbers may emerge either for the column total since two distance values are always obtained for the same distance, namely from the first point to the second point and from the second point to the first point.

As can be gathered from Tables 515 and 525, the inputs into the tables are reflected on the diagonal provided with zeros. In the present example the mathematical plausibility test for the measured measuring points shows that no measuring point needs to be eliminated. If, however, the column total were to include a "0" or "1", then the measuring point would not be part of the fixed point field and would have to be eliminated, after which the described routine would have to be run through again. Therefore, the procedural steps described in FIG. 3 can be implemented by simple table calculations. After this plausibility check the sequence shown in FIG. 5*a* passes onto the steps described in FIG. 5*c*.

A further mathematical plausibility check can be carried out for the fixed points, as described by means of Table 535 in FIG. 5*b*.

Table 535 is produced by comparing the distances of the measuring points with the distances of the fixed points and has a dimension of the fixed points. The cells with a "1" clearly indicate that for these distances of the fixed points there is an identical or corresponding distance of the measuring points. A "0" signifies that there is no corresponding distance. With the aid of this Table 535, as described in FIG. 4, a number of corresponding fixed point distances of fixed points are identified in the fixed point field, and by means of the column analysis described below, fixed points corresponding to fixed point distances, for which there are no corresponding measuring points, can be identified and then rejected. In particular, the identification includes a comparison of the fixed point distances and adding up of the number of corresponding fixed point distances.

In order to obtain Table 535, in detail distances of Table 515 (stretchMP) and Table 525 (stretchFP) are compared, and with correspondence of distances with a specific tolerance a "1" is written into the corresponding cell of the table. As previously for Table 525, the point numbers are entered in the vertical and horizontal direction. In this example it is clear that corresponding distances have been found among the measuring point distances, namely for the distances between points 1 and 2 (the same also always applies to the opposite direction, i.e. points 2 and 1); points 1 and 6; points 1 and 7; points 2 and 6; points 2 and 7 and points 6 and 7. The other points with a "1" in the cell do not stand up to the plausibility check described below.

According to the plausibility check a column total is calculated in order to find out whether there are fixed points which can not be assigned to measuring points, even if there are corresponding stretches (cells with a "1").

If the column total is greater than n−1, n being the number of measuring points (four measuring points here), then all of the critical points are checked and incorrect points are deleted. In this check, for example, the tolerances can to be chosen to be smaller than previously described, e.g. +/−1%. If the column total is less than n−1, i.e. less than "3" in the present case, the fixed points are not considered any further. This is the case for the fixed points 3, 4, 5, 8, 9, 10, 11, 12, 13, 14 and 15. For these fixed points only a column total of "0", "1" or "2" is produced. For the fixed points 1, 2, 6 and 7, however, a column total of "3" is produced. This means that for each of these points there are three different distances for the three different adjacent points. This logic is also shown in FIG. 2*b* in which three stretches respectively pass from each fixed point. Therefore a clear solution to the assignment problem emerges for n−1.

The results obtained from the considerations of Tables 530 and 535 are used to obtain Table 540 in FIG. 5*c*. Here the distances of Tables 515 and 525 are compared after removing any distances which are out of the question and which are removed by the plausibility checks described above.

As shown in FIG. 2*b* and designated above by letters A-F, there are at most six different distances for four points. These six distances are now written into Table 540 one below the other and the corresponding pairs of points from Tables 515 and 525 are assigned according to the corresponding distance. In the first line for the distance 6,000 the line position and column position of the distance from Table 525 is entered for the corresponding fixed points and the line position and column position of the same distance of Table 515 is entered for the measuring points. In the second line the same is repeated for the distance 6,538. When this has been carried out for all six distances, there is produced an assignment in Table 540 of positions of Table 515 (stretchMP) to positions of Table 525 (stretchFP), by means of which assignment independent of the coordinate system takes place.

In the step following Table 540 it is checked in FIG. 5*c* whether the dimension of the measuring points (identStsingleMP) corresponds to the dimension of the used fixed points (identStsingleFP). This is carried out by means of the two vectors 542 and 544 shown. In order to be able to provide a clear assignment, the vectors must present once each point which has arisen in a corresponding distance. This applies respectively to the fixed points and to the measuring points. In the case shown of vectors 542 and 544 the dimension for both vectors is the same, namely "4", and so one can advance to consideration of the focal point.

If, however, the mathematical plausibility check shows that the dimensions of the vectors do not correspond and an assignment can not be released, the individual points used for the desired assignment must be considered once again, as shown in FIG. 5*c* by the arrow to the left back to FIG. 5*a*. In particular, the fixed points of the fixed point field being considered must be critically checked, i.e. checked to see whether tolerances have been set too high or if there are other measuring errors or assignment errors.

In order to resolve the problem a point number from the fixed point field could also be assigned to a measuring point so that specific constellations can be ruled out as regards the assignment and the identification of a corresponding fixed point for a measuring point is simplified. After this Table 540 can be produced again, as described above (see arrow back to FIG. 5*a* at the position below Table 530).

In the present case, however, there is a correspondence in the dimension so that, as mentioned, the focal point 546, i.e. the center of mass in this example, can be calculated as a reference point of the measuring points (see focalMP). Here the known equation for calculating a geometric focal point constitutes for example a reference point determining method. In the same way the focal point 548 can be calculated as a reference point of the fixed points used (see focalFP). The coordinates of the focal point of the measuring points are designated by 546 and the coordinates of the focal point of the fixed points are designated by 548.

By using the focal point 546 and 548 the directional angle t and distances s from the focal point to the measuring points (identStsingleMP) and the used fixed points (identStsingleMP) can be calculated by the following equations and be entered in tables 552 and 554:

$$s = \sqrt{(x_{PNR} - x_{focalMP}) + (y_{PNR} - y_{focalMP})^2}, \text{ and}$$

$$t = \tan^{-1}\left(\frac{x_{PNR} - x_{focalMP}}{y_{PNR} - y_{focalMP}}\right)$$

The angles and distances obtained in this way are reference point parameters of the measuring points and fixed points corresponding to the pairs of distances with regard to the focal point as a reference point. From Table 552 one can now see the distances s between respectively one of the measuring points with corresponding point numbers 202, 201, 206 and 207 to the focal point of the measuring points. Similarly, as shown in Table 554, the distances s between the fixed points with point numbers 1, 2, 6 and 7 to the focal point of the fixed points can be obtained.

By means of Tables 552 and 554 the distances between the focal point and so the corresponding matching points can be identified since assignment by means of the distances is clearly possible in the present example. This assignment is produced as shown in Table 560. The measuring point with point number 201 corresponds accordingly to the fixed point with point number 1, the measuring point with point number 202 corresponds to the fixed point with point number 2, the measuring point with point number 206 corresponds to the fixed point with point number 6 and the measuring point with point number 207 corresponds to the fixed point with point number 7. Therefore the measuring points can be clearly identified in the fixed point field.

From considering Tables 552 and 554 it becomes clear that the directional angles can not be compared to one another immediately since they are obtained with regard to different reference directions. However, the correspondences are shown immediately if a difference angle between two points is calculated. For example, the angle difference between the angle of point number 201 and the angle of point number 202 is identical to the angle difference between the angle of point number 1 and the angle of point number 2.

If identification by means of the distances is not yet possible or is not clearly possible the assignment can also take place by means of the directional angles.

If the assignment of the measuring points to the fixed points, i.e. in particular the assignment of the corresponding point numbers, as shown in Table 560, is known, the position of the measuring instrument focusing on and measuring the measuring points can be identified easily. Since the coordinates of the measuring points in the fixed point coordinate system are known, the position of the measuring instrument can also be obtained easily by using Table 505 or 510. For example, a coordinate transformation from the fixed point coordinate system into the measuring point coordinate system and vice versa can be found which transforms the origin of the measuring point coordinate system, i.e. the position of the measuring instrument, into the fixed point coordinate system. Consequently, positioning of the measuring instrument without previous knowledge of the point number of a point focused on can take place.

Figure 6:
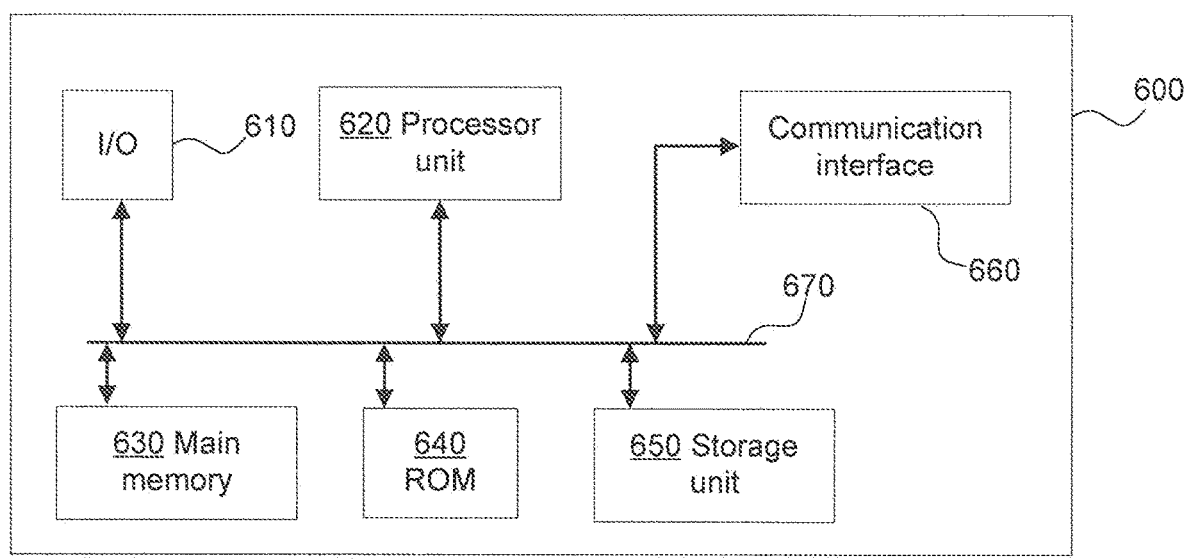
FIG. 6 shows elements of an apparatus for assigning measuring points to a set of fixed points according to another embodiment.

In the following, in FIG. 6 an apparatus for assigning measuring points to fixed points is described. FIG. 6 is a schematic block diagram of an apparatus 600 which is capable of implementing the above method. The exemplary apparatus 600 contains an input/output interface, I/O interface 610, which exchanges information with a processor unit 620 which can be contained in a controller. The apparatus can further comprise a main memory 630, a ROM 640 and a memory unit 650, as well as a communication interface 660. A bus 670 can constitute a path which enables the exchange of information between the components of the apparatus.

The processor unit 620 can contain a processor, a microprocessor or some other type of processing logic which can interpret and execute instructions. The main memory 630 can contain an RAM or some other dynamic storage medium that can store information and instructions to be executed by the processor unit 620. ROM 640 can be any ROM medium or some other type of static storage medium that stores information and instructions to be used by the processor unit 620. The storage unit 650 can contain a magnetic and/or optical recording medium and/or a corresponding drive.

The I/O interface 610 can contain a mechanism which enables a user to enter information via a keyboard, a mouse, speech recognition etc. and to receive outputted information via a display, printer, loudspeaker etc. The communication interface 660 can contain a mechanism for communication with another device or system. In particular when the apparatus is used with a measuring instrument the communication interface can provide data exchange. For example, information on a fixed point field can be obtained, such as for example coordinates of fixed points. Information can be received wirelessly via the communication interface 660 or the communication interface offers the possibility of receiving information via different connection cables, such as for example USB or FireWire. A communication interface which accommodates a flash memory can also be provided.

The apparatus 600 can execute steps or processes which are described here. In particular, the apparatus 600 can execute these steps or processes in response to the execution of software instructions which are stored on a computer-readable medium, such as for example the main memory 630, ROM 640 and/or storage unit 650 by the processor unit 620. The software instructions can be provided here in the form of a program and be embodied in a computer program product.

A computer-readable storage medium can be defined as a physical or logical storage unit. For example, this storage unit can contain a storage space with a separate physical memory or a distributed multiple memory. The magnetic and/or optical recording medium (for example CDs or DVDs) of the storage unit 650 can also contain a computer-readable storage medium. The software instructions to be executed by the processor unit can be read from any computer-readable storage medium into the main memory 630, such as for example from the storage unit 650 or from another device/server via the communication interface 660.

If they are executed by at least one processor of the processor unit of the apparatus, these instructions can cause a processor unit 620 to carry out processes, operations or steps of the method which have been described here. Alternatively, a hard-wired circuit can be provided instead of or in combination with the software instructions in order to implement the processes and/or steps. Therefore, implementations described here are not restricted to a specific combination of hardware and software.

For example, an apparatus for assigning measuring points to a set of fixed points can comprise individual modules which respectively provide means for carrying out a specific function. These modules or means, which are interconnected and interact with one another, can, as described above, be realised by software or hardware. The apparatus thereby comprises means for calculating fixed point distances between a plurality of fixed points of the set of fixed points using the coordinates of the fixed points in a fixed point coordinate system; means for determining coordinates of a plurality of measuring points in a measuring point coordinate system; means for calculating measuring point distances between the plurality of measuring points; means for comparing at least two measuring point distances with the fixed point distances, and identifying at least two pairs respectively consisting of a measuring point distance and a fixed point distance; means for determining a reference point in the measuring point coordinate system by means of a reference point determining method using the coordinates of the measuring points corresponding to the pairs; means for determining a reference point in the fixed point coordinate system by means of the reference point determining method using the coordinates of the fixed points corresponding to the pairs; means for determining first reference point parameters of the measuring points corresponding to the pairs in the measuring point coordinate system; means for determining second reference point parameters of the fixed points corresponding to the pairs in the fixed point coordinate system; means for identifying correspondences between the first reference point parameters in the measuring point coordinate system and the second reference point parameters in the fixed point coordinate system and assigning the corresponding measuring points to the corresponding fixed points.

The exemplary apparatuses described above can be used in a surveying instrument or constitute a surveying instrument that determines the distances described above by electromagnetic distance measurement.

In the example in which the apparatus comprises a surveying instrument, the means for calculating, for comparing and for identifying is/are realized, for example, by a processor unit, such as processor unit 620. The means for determining coordinates of a plurality of measuring points can be realized by an EDM unit (EDM=Electronic Distance Measurement) for electromagnetic distance measurement. Means for determining a reference point in the measuring point coordinate system and/or a reference point in the fixed point coordinate system can also be realized by a processor unit or a controller containing such a processor unit. In the same way, means for determining first reference point parameters and/or second reference point parameters can be realized by such a processor unit.

A processor unit, such as for example the processor unit 620, is a calculation unit that is used to calculate one or more processors which execute/s the functions corresponding to the above procedural steps. In particular, the processor unit or the controller can be realized by a PC or some other type of computer. Alternatively, the processor unit or the controller can be realized by a Field Programmable Gate Array (FPGA) or integrated circuit, such as for example an ASIC (Application-Specific Integrated Circuit) or software or an appropriate combination of the above, but is not restricted to these.

As already mentioned, the functions of the apparatus can be embodied as software instructions in a software program and be realized by a processor and one or more memories, such as e.g. a RAM, ROM, hard disk, EEPROM, flash memory, etc. A program code, which is stored in a memory, can be a program with instructions which are designed to cause the processor of a processor unit to execute the steps and functions of the method/apparatus described above.

This program can be embodied in the computer-readable storage medium described above. The computer-readable storage medium can be concrete, such as for example a disk or a data carrier. A computer program product can comprise the computer-readable storage medium and so contain the program, and if loaded into a program memory of a computer can cause the processor to execute the steps and functions described above.

As described above, the above embodiments and examples make it possible to assign measuring points to fixed points and so to obtain measuring points in fixed point coordinates without manual assignment of point numbers by a user. In this way the method described above can be carried out quickly and automatically without user intervention and so can also be carried out easily by non-experts. In particular, by associating measuring points and fixed points a transformation between the measuring point coordinate system and the fixed point coordinate system can be found, and so also the position of a measuring instrument that measures or surveys the measuring points can be registered in the fixed point coordinate system. In this way so-called free positioning of the measuring instrument is possible without manual assignment of point numbers.

The handling of the measuring instrument is simplified and its position in the fixed point coordinate system can be found quickly and automatically.

The person skilled in the art recognizes that different modifications and variations in the described methods and apparatuses can be made without straying from the scope or spirit of the invention.

The invention has been described in relation to specific embodiments and examples which are to be considered as representative, but not restrictive. The person skilled in the art recognizes that many different combinations of hardware, software and firmware can be used to implement the invention.

In addition, other implementations of the invention will become clear to the person skilled in the art by considering the description and implementation of the invention that is disclosed here. The descriptions of the examples are only intended to be considered as examples. It should therefore be recognized that aspects of the invention can also be found in less than all of the features of the previously disclosed implementations and configurations. Therefore, the true scope and spirit of the invention is represented by the following claims.

The invention claimed is:

1. A method for assigning measuring points to a set of fixed points at a building site using a geodetic measuring instrument to decrease manpower and/or reduce human error while mapping measuring points to fixed points, the method comprising:
    calculating fixed point distances between a plurality of fixed points of the set of fixed points using coordinates of the fixed points in a fixed point coordinate system, wherein the fixed points are existing surveying points, positions of which are known;
    determining coordinates of a plurality of measuring points at the building site, using a tacheometer, a theodolite, or a total station, in a measuring point coordinate system;
    calculating measuring point distances between the plurality of measuring points;
    comparing at least two measuring point distances with the fixed point distances and identifying at least two pairs each consisting of a measuring point distance and a fixed point distance;
    determining a reference point in the measuring point coordinate system by means of a reference point determining method using coordinates of the measuring points corresponding to the pairs;

determining a reference point in the fixed point coordinate system by means of the reference point determining method using the coordinates of the fixed points corresponding to the pairs;

determining first reference point parameters of measuring points corresponding to the pairs in the measuring point coordinate system;

determining second reference point parameters of the fixed points corresponding to the pairs in the fixed point coordinate system;

identifying correspondences between the first reference point parameters in the measuring point coordinate system and the second reference point parameters in the fixed point coordinate system;

identifying fixed points that do not correspond with measuring points based on identifying a number, wherein the number is of fixed point distances in the fixed point coordinate system that correspond to measuring point distances;

rejecting fixed points corresponding to fixed point distances of the number of fixed point distances to avoid ambiguities and/or to simplify identification of corresponding fixed points to measuring points, wherein:

rejected fixed points are not considered during assignment of measuring points to corresponding fixed points; and the rejecting is based on:
the number of fixed point distances that correspond to measuring point distances; and
the number of fixed point distances that correspond to measuring point distances of a given fixed point being less than n−1, wherein n is a number of measuring points; and assigning measuring points to corresponding fixed points after rejecting some fixed points, to map measuring points to fixed points for aiding in accurate construction at the building site.

2. The method according to claim 1, the first reference point parameters include reference point-dependent distances and/or angles in the measuring point coordinate system.

3. The method according to claim 2, the assignment being carried out by using distances from the reference point, and if no clear assignment is achieved here, the assignment being carried out by using angles.

4. The method according to claim 1, the first reference point parameters including distances between measuring points corresponding to the pairs and the reference point in the measuring point coordinate system and/or angles in the measuring point coordinate system that are associated with measuring points corresponding to the pairs.

5. The method according to claim 1, the second reference point parameters including distances between the fixed points corresponding to the pairs and the reference point in the fixed point coordinate system and/or angles in the fixed point coordinate system which are associated with the fixed points corresponding to the pairs.

6. The method according to claim 1, the reference point being a focal point of measuring points and fixed points corresponding to the pairs.

7. The method according to claim 1, further comprising:
identifying measuring points that do not correspond to fixed points; and
removing measuring points from the plurality of measuring points using calculated measuring point distances and fixed point distances.

8. The method according to claim 7, the identification including comparing the fixed point distances with the measuring point distances, and if there is no fixed point distance corresponding to a measuring point distance, rejecting at least one measuring point corresponding to the measuring point distance.

9. The method according to claim 1, further comprising:
determining coordinates of measuring points by means of a measuring instrument; and
calculating the coordinates in the measuring point coordinate system in relation to a position of the measuring instrument.

10. The method according to claim 1, the fixed point coordinate system itself being defined by a measuring instrument executing the method.

11. An apparatus for assigning measuring points to a set of fixed points, including at least one processor and at least one non-transitory computer-readable storage medium with instructions stored in the at least one non-transitory computer-readable storage medium, when the instructions are executed by the at least one processor of the apparatus, the at least one processor being designed to carry out the steps of the method according to claim 7.

12. A program for a data processing device for executing the method according to claim 1.

13. A computer program product that contains the program according to claim 12.

14. An apparatus for assigning measuring points to a set of fixed points at a building site using a geodetic measuring instrument to decrease manpower and/or reduce human error while mapping measuring points to fixed points, the apparatus comprising:

means for calculating fixed point distances between a plurality of fixed points of the set of fixed points using coordinates of the fixed points in a fixed point coordinate system, wherein fixed points are existing surveying points, positions of which are known;

means for determining coordinates of a plurality of measuring points at the building site in a measuring point coordinate system, wherein the means for determining coordinates of the plurality of measuring points is a tacheometer, a theodolite, or a total station;

means for calculating measuring point distances between the plurality of measuring points;

means for comparing at least two measuring point distances with the fixed points distances and identifying at least two pairs each consisting of a measuring point distance and a fixed point distance;

means for determining a reference point in the measuring point coordinate system by means of a reference point determining method using the coordinates of the measuring points corresponding to the pairs;

means for determining a reference point in the fixed point coordinate system by means of the reference point determining method using coordinates of fixed points corresponding to the pairs;

means for determining first reference point parameters of measuring points corresponding to the pairs in the measuring point coordinate system;

means for determining second reference point parameters of the fixed points corresponding to the pairs in the fixed point coordinate system;

means for:

identifying correspondences between the first reference point parameters in the measuring point coordinate system and the second reference point parameters in the fixed point coordinate system;

identifying fixed points that do not correspond with measuring points based on identifying a number, wherein the number is of fixed point distances of fixed points in the fixed point coordinate system that correspond to measuring point distances;

rejecting fixed points corresponding to fixed point distances of the number of fixed point distances to avoid ambiguities and/or to simplify identification of corresponding fixed points to measuring points, wherein:

rejected fixed points are not considered during assignment of measuring points to corresponding fixed points; and the rejecting is based on:

the number of fixed point distances that correspond to measuring point distances; and the number of fixed point distances that correspond to measuring point distances of a given fixed point being less than $n-1$, wherein n is a number of measuring points; and assigning measuring points to corresponding fixed points after rejecting some fixed points, to map measuring points to fixed points for aiding in accurate construction at the building site.

15. The apparatus according to claim 14, the apparatus comprising a surveying instrument that determines distances by electromagnetic distance measurement.

* * * * *